United States Patent
Viertel et al.

[11] Patent Number: 5,984,399
[45] Date of Patent: Nov. 16, 1999

[54] SUN VISOR FOR VEHICLES

[75] Inventors: Lothar Viertel, Altforweiler, Germany; Patrick Welter, La Chambre; Didier Couchois, Guerting, both of France

[73] Assignee: Becker Group Europe GmbH, Wuppertal, Germany

[21] Appl. No.: 09/120,698

[22] Filed: Jul. 22, 1998

[30] Foreign Application Priority Data

Jul. 23, 1997 [DE] Germany .......................... 197 31 534

[51] Int. Cl.$^6$ ....................................................... B60J 3/00
[52] U.S. Cl. ........................................ 296/97.1; 296/97.8
[58] Field of Search ............................. 296/97.1, 97.5, 296/97.8

[56] References Cited

U.S. PATENT DOCUMENTS

| | | | |
|---|---|---|---|
| 3,191,986 | 6/1965 | Simon | 296/97.8 |
| 3,201,170 | 8/1965 | Weingarten | 296/97.8 |
| 3,371,955 | 3/1968 | Herrington, Sr. | 296/97.8 |
| 4,280,730 | 7/1981 | Turner | 296/97.8 |
| 4,878,708 | 11/1989 | Champane | 296/97.8 |
| 4,944,548 | 7/1990 | Payne et al. | 296/97.8 |
| 4,947,920 | 8/1990 | Moll | 296/97.8 |
| 4,958,880 | 9/1990 | Champane | 296/97.8 |
| 4,989,910 | 2/1991 | Mersmn et al. | 296/97.8 |
| 5,015,027 | 5/1991 | Rifaat | 296/97.8 |
| 5,076,634 | 12/1991 | Miller et al. | 296/97.5 |
| 5,626,381 | 5/1997 | Gervassoni et al. | 296/97.8 |

FOREIGN PATENT DOCUMENTS

| | | | |
|---|---|---|---|
| 0053053 | 6/1982 | European Pat. Off. | 296/97.1 |
| 0090157 | 10/1983 | European Pat. Off. | 296/97.1 |
| 0400552 | 12/1990 | European Pat. Off. | 296/97.8 |
| 2313226 | 12/1976 | France | 296/97.8 |
| 0447537 | 2/1950 | Italy | 296/97.8 |
| 0574552 | 3/1958 | Italy | 296/97.1 |
| 0111519 | 4/1989 | Japan | 296/97.1 |
| 0293222 | 11/1989 | Japan | 296/97.8 |
| 406048174 | 2/1994 | Japan | 296/97.5 |
| 0882499 | 11/1961 | United Kingdom | 296/97.8 |
| 2098941 | 12/1982 | United Kingdom | 296/97.1 |
| 2173461 | 10/1986 | United Kingdom | 296/97.8 |

*Primary Examiner*—Joseph D. Pape
*Assistant Examiner*—Kiran Patel
*Attorney, Agent, or Firm*—Harness, Dickey & Pierce, P.L.C.

[57] ABSTRACT

A sun visor for vehicles, which has a sun visor body made of plastic and a main element and an end element. The end element may be oriented obliquely in relation to the main element. A casing, which encloses all of the sun visor body and is made from foil blanks or the like, is provided for the connection between the main element and the end element. In addition to a circumferential weld bead, a weld bead fixes the foil blanks in place with respect to each other and defines a predetermined bending place in the area located between the main element and the end element. For reinforcement and for improvement of the appearance of this sun visor, a cover device is provided, which surrounds the additional weld bead and the predetermined bending location in the shape of a ring, but does not hamper the intended bending of the end element.

20 Claims, 1 Drawing Sheet

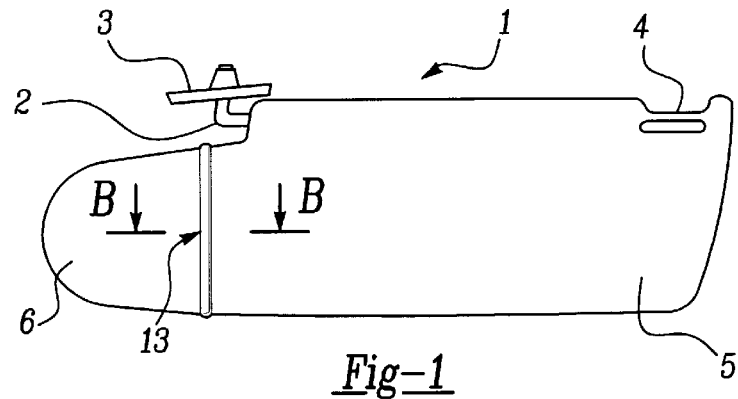
*Fig-1*
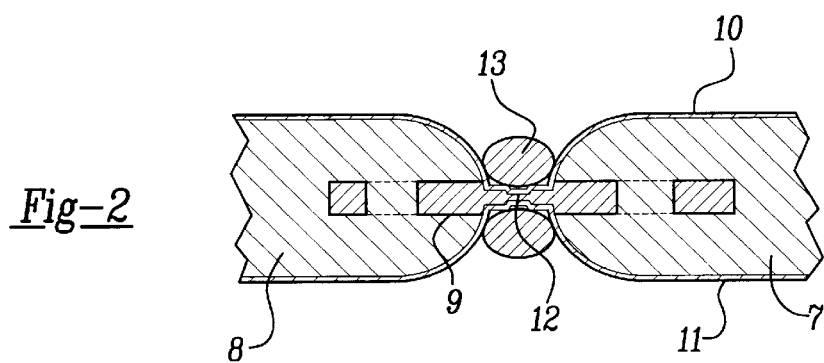
*Fig-2*
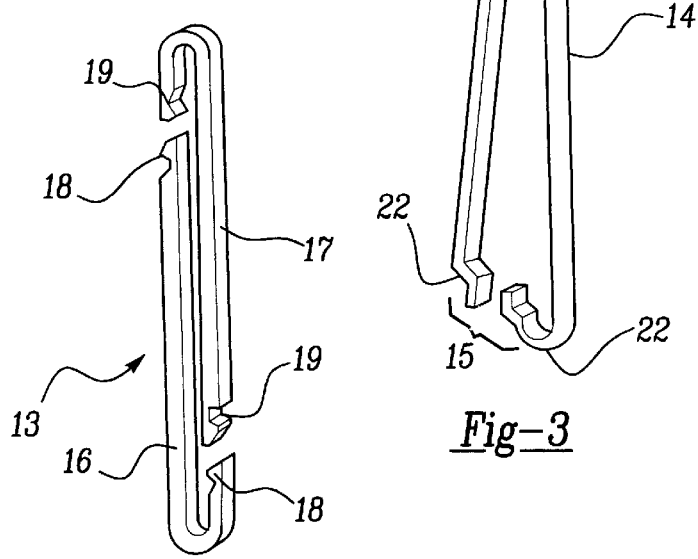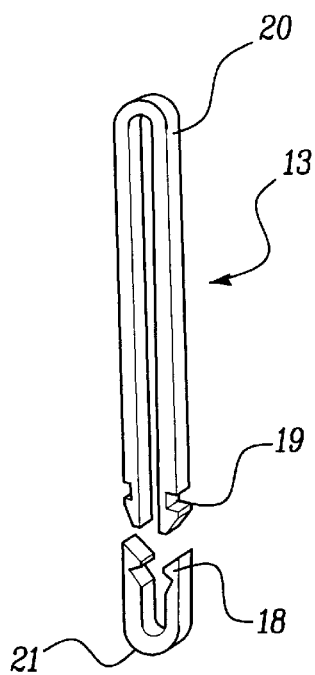

SUN VISOR FOR VEHICLES

FIELD OF THE INVENTION

The invention relates to a sun visor for vehicles, having a sun visor body made of plastic and having a main element and an end element. The end element may be oriented obliquely in relation to the main element. A casing, which encloses all of the sun visor body and is made from foil blanks or the like, is provided for the connection between the main element and the end element. In addition to a circumferential weld bead, another weld bead fixes the foil blanks in place in respect to each other and defines a predetermined bending place in the area between the main element and the end element.

BACKGROUND OF THE INVENTION

Sun visors with an end element, which can be bent obliquely away from the main element, are suitable to be matched to the shape of the roof of a vehicle, and, in particular, in the transition area toward the windshield pillar and are part of the prior art. For example, U.S. Pat. No. 3,610,680 discloses a sun visor, with a sun visor body divided into a main element and an end element by a perforation line, wherein the end element can be oriented obliquely relative to the main element. The connection between the main element and the end element of the sun visor body of the known sun visor is quickly lost during normal use of the sun visor, so that the end element hangs down limply from the main element, which is not considered to be beautiful, aside from the fact that the sun visor can only partially perform its function.

SUMMARY OF THE INVENTION

Based on a sun visor of the type mentioned above, it is an object of the present invention to provide the connection between the main element and the bendable end element of the sun visor body to not require any particular outlay. It is another object that the ability of the sun visor to function is assured during the entire service life. It is another object that the aesthetic appearance of the sun visor completely meets the respective requirements of the users.

These objects are attained in accordance with the present invention by providing the sun visor body with a cover device, which surrounds the additional weld bead and the predetermined bending location in the shape of a ring, but does not hamper the intended bending of the end element.

The cover device can fill the gap between the main element and the end element of the sun visor body and, in the process, is evenly supported on the main element and the end element, so that under normal circumstances the end element of the sun visor body cannot hang down limply. By means of the cover device, the groove-shaped recessed areas caused by the welding process, which are visible at the broad sides of the sun visor body, as well as possible irregularities in the weld bead and all collapsed places, are shielded from the sight of a viewer. In this manner, the visual appearance of the sun visor is considerably improved.

The cover device is comprised of a very simple, cost-effective component, which, in addition, can be mounted quickly and without problems. Accordingly, one embodiment of the invention provides that the cover device is a two-armed, hairpin-shaped clip, with the free clip ends being fixed in place on each other by hook means formed on them. It is obvious that such a clip does not cause any difficulties in production or assembly techniques. The clip may be made as an injection-molded plastic element and is mounted by simply pushing it on and then clipping it together.

In another embodiment, the cover device includes two U-shaped clip elements, which are snapped into each other and have hook means at the free ends of the legs. In this case, the U-shaped legs can be embodied with equal or unequal length of the legs.

In order not to hamper the intended bending of the end element, it is preferred that the cover device be made rounded at least on the sides lying against the sun visor body. For reasons of improved appearance and improved styling, the design of a general rounding with an oval cross section of the clip legs, for example, is preferred.

These and other objects, advantages, and features of the present invention will be better understood upon review of the following detailed description of the preferred embodiments.

BRIEF DESCRIPTION OF THE DRAWINGS

FIG. 1 illustrates a sun visor body in plan view;

FIG. 2 is a sectional view along the line B—B in FIG. 1;

FIG. 3 illustrates one embodiment of the cover device of the present invention;

FIG. 4 illustrates another embodiment of the cover device of the present invention; and FIG. 5 illustrates another embodiment of the cover device of the present invention.

DETAILED DESCRIPTION OF THE PREFERRED EMBODIMENTS

FIG. 1 illustrates a sun visor body 1 of a vehicle sun visor with a sun visor shaft 2, a small bearing block 3 and a hook bridge 4 for the conventional arrangement and fastening of the sun visor on the vehicle body above a windshield.

As shown in FIG. 1, the sun visor body 1 is divided into a main element 5 and an end element 6. The end element 6 may be oriented obliquely in relation to the main element 5. The main element 5 is made of a plastic body 7, and the end element is also made of a plastic body 8. The plastic bodies 7, 8 may be foamed, blown or injection-molded bodies. In the alternative, the bodies 7, 8 may be made of another material, such as, for example, a natural or synthetic pressed material or the like. The plastic bodies 7, 8 are preferably, but not necessarily, connected with each other via an insert body 9 placed into both bodies.

The entire sun visor body 1 is enclosed in a casing formed by foil blanks 10, 11. The foil blanks 10, 11 are welded together in the conventional manner at their edges, which follow the circumference of the sun visor body 1, to form a circumferential weld bead. An additional weld seam 12, which can be made continuously or with breaks, is provided for connecting the foil blanks 10, 11 in the area between the main element 5 and the end element 6 of the sun visor body 1. If an insert body 9 is provided, a connection of the foil blanks 10, 11 is made by means of the insert body 9, or through openings formed therein. The weld bead 12 defines a predetermined bending location for the end element 6.

As shown in FIGS. 1 and 2, the area of connection between the main element 5 and the end element 6 of the sun visor body is equipped with a cover device 13. The cover device 13 is used to provide improved cohesion between the main element 5 and the end element 6, so that the end element 6 does not hang down limply, which can occur especially if the insert body 9 is not provided. Furthermore, the cover device 13 is used to lend an improved appearance to the sun visor in that it covers the weld seam 12, as well as all the collapsed places in the transition area between the main element 5 and the end element 6, from the sight of the viewer.

FIG. 3 illustrates one embodiment of the cover device 13. In this embodiment, the cover device 13 is a one-piece, hairpin-shaped clip 14 with free clip ends 22. The clip ends 22 may be fastened to each other via hook means 15 formed on the clip ends 22. The clip 14 surrounds the sun visor body 1 in the area of the weld bead 12 in a ring shape in the manner of a hoop, and is supported on both the main element 5 and the end element 6, as can be seen in FIG. 2. The size of the width of the clip 14 is matched to the gap width between the main element 5 and the end element 6 and is only a few millimeters.

FIG. 4 illustrates another embodiment of the cover device 13. In this embodiment, the cover device 13 is two U-shaped clip elements 16, 17, which can be inserted so they are enveloping. The clip elements 16, 17 both have clip projections 18 and clip recesses 19, which can respectively be snapped into each other to clip the clip elements 16, 17 together. The clip arms of the clip elements 16, 17 respectively have different lengths which, however, is not absolutely necessary. Similar to the clip 14, the clip elements 16, 17 surround the sun visor body 1 in the area of the weld bead 12 in a ring shape in the manner of a hoop, and at least one of the clip elements is supported on both the main element 5 and the end element 6. The size of the width of the clip elements 16, 17 are matched to the gap width between the main element 5 and the end element 6 and is only a few millimeters.

FIG. 5 illustrates another embodiment of the present invention. In this embodiment, the cover device 13 is two U-shaped clip elements 20, 21, wherein the clip element 20 is considerably longer than the clip element 21. The clip elements 20, 21 both have clip projections 18 and clip recesses 19 (which correspond to those in FIG. 4), which can respectively be snapped into each other to clip the clip elements 20, 21 together. Similar to the clip 14 and the clip elements 16, 17, the clip elements 20, 21 surround the sun visor body 1 in the area of the weld bead 12 in a ring shape in the manner of a hoop, and at least one of the clip elements is generally supported on both the main element 5 and the end element 6. The size of the width of the clip elements 20, 21 are matched to the gap width between the main element 5 and the end element 6 and is only a few millimeters.

The application of the novel cover device 13 on the sun visor body 1 is performed by simply pushing it on in the area of connection between the main element 5 and the end element 6 and locking it, either through the hook means 15 (in FIG. 3) or by the hook means of clip protrusions 18 and recesses 19 (in FIGS. 4 and 5).

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A sun visor for vehicles comprising:
   a sun visor body, said sun visor body having a main element and an end element,
   said end element capable of being oriented obliquely relative to said main element,
   a casing which encloses all of said sun visor body and is made from foil blanks, said casing provided for connecting said main element and said end element,
   a weld bead which fixes said foil blanks in place with respect to each other and defines a predetermined bending place, said weld bead being positioned in an area located between said main element and said end element, and
   a cover device which surrounds said weld bead and said predetermined bending location, and which is in the shape of a ring which does not hamper the intended bending of said end element.

2. The sun visor of claim 1 wherein the cover device is a one-piece, two-armed, hairpin-shaped clip with ends, said ends having hook means formed on them, wherein said clip is fixed in place to surround said weld bead and said predetermined bending location by fixing said clip ends together by said hook means.

3. The sun visor of claim 1 wherein the cover device is two generally U-shaped clip elements with ends, said ends having hook means formed on them, wherein said clip elements are fixed together to surround said weld bead and said predetermined bending location by fixing said clip ends together by said hook means.

4. The sun visor of claim 3 wherein said hook means is comprised of protrusions and recesses formed on said ends of said clip elements.

5. The sun visor of claim 3 wherein one of said clip elements is longer than the other clip element.

6. The sun visor of claim 3 wherein one of said clip elements is considerably longer than the other clip element.

7. The sun visor of claim 1 wherein said cover device is rounded at least on the sides resting against the sun visor body.

8. The sun visor of claim 1 wherein the cover device is plastic and is injection-molded.

9. The sun visor of claim 1 wherein said cover device is supported on both said main element and said end embodiment.

10. The sun visor of claim 1 wherein the width of said cover device is matched to the area between said main element and said end element.

11. The sun visor of claim 1 wherein said sun visor body is comprised of a plastic material.

12. The sun visor of claim 1 wherein said main element is made of a plastic body, and said end element is also made of a plastic body.

13. The sun visor of claim 12 wherein the plastic bodies of said main and end elements are foamed, blown or injection-molded bodies.

14. The sun visor of claim 1 wherein said main element and said end element are comprised of a natural or synthetic pressed material.

15. The sun visor of claim 1 further comprising an insert body connecting said main element and said end element by connecting said foil blanks.

16. A method of placing a cover device on a sun visor for vehicles comprising the steps of:
   providing a sun visor body, said sun visor body having a main element and an end element, said end element capable of being oriented obliquely relative to said main element,
   providing a casing for connecting said main element and said end element, said casing enclosing all of said sun visor body and being made from foil blanks,
   welding a weld bead to fix said foil blanks in place with respect to each other, wherein said weld bead defines a predetermined bending place and is positioned in an area located between said main element and said end element, and placing a cover device surrounding said weld bead and said predetermined bending location, wherein said cover device is in the shape of a ring which does not hamper the intended bending of said end element.

17. The sun visor of claim 16 wherein the cover device is a one-piece, two-armed, hairpin-shaped clip with ends, said ends having hook means formed on them and further comprising the step of fixing said clip in place surrounding said weld bead and said predetermined bending location by fixing said clip ends together by said hook means.

18. The sun visor of claim 16 wherein the cover device is two generally U-shaped clip elements with ends, said ends having hook means formed on them and further comprising the step of fixing said clip elements in place surrounding said weld bead and said predetermined bending location by fixing said clip ends together by said hook means.

19. The sun visor of claim 18 wherein said hook means is comprised of protrusions and recesses formed on said ends of said clip elements.

20. The sun visor of claim 18 wherein one of said clip elements is longer than the other clip element.

* * * * *

UNITED STATES PATENT AND TRADEMARK OFFICE
CERTIFICATE OF CORRECTION

PATENT NO. : 5,984,399
DATED : November 16, 1999
INVENTOR(S) : Lothar Viertel, Patrick Welter and Didier Couchois It is certified that error appears in the above-identified patent and that said Letters Patent is hereby corrected as shown below:

In Column 4, Line 35-36, Claim 9, "Embodiment" should read as --element--.

Signed and Sealed this

Seventh Day of November, 2000

Attest:

Q. TODD DICKINSON

*Attesting Officer*           *Director of Patents and Trademarks*